United States Patent
Uchino

(10) Patent No.: US 7,120,831 B2
(45) Date of Patent: Oct. 10, 2006

(54) IN-CIRCUIT EMULATOR SYSTEM WITH CHANGEABLE CLOCK FREQUENCY

(75) Inventor: Chikao Uchino, Tokyo (JP)

(73) Assignees: Renesas Technology Corp., Tokyo (JP); Mitsubishi Electric Semiconductor Application Engineering Corporation, Tokyo (JP)

(*) Notice: Subject to any disclaimer, the term of this patent is extended or adjusted under 35 U.S.C. 154(b) by 553 days.

(21) Appl. No.: 10/409,579

(22) Filed: Apr. 9, 2003

(65) Prior Publication Data
US 2004/0078671 A1    Apr. 22, 2004

(30) Foreign Application Priority Data
Oct. 16, 2002   (JP) .............................. 2002-301845

(51) Int. Cl.
*G06F 11/00*    (2006.01)
(52) U.S. Cl. ................. 714/30; 714/34; 714/738; 714/744
(58) Field of Classification Search ............... 714/30, 714/34, 738, 744
See application file for complete search history.

(56) References Cited

U.S. PATENT DOCUMENTS

| | | | | |
|---|---|---|---|---|
| 5,321,828 A | * | 6/1994 | Phillips et al. ............... | 703/28 |
| 5,889,936 A | * | 3/1999 | Chan ........................... | 714/39 |
| 6,243,841 B1 | * | 6/2001 | Mydill ......................... | 714/724 |
| 6,249,893 B1 | * | 6/2001 | Rajsuman et al. ........... | 714/741 |
| 6,665,821 B1 | | 12/2003 | Miyayama et al. | |
| 2003/0084390 A1 | * | 5/2003 | Tamarapalli et al. ........ | 714/744 |

FOREIGN PATENT DOCUMENTS

| | | |
|---|---|---|
| JP | 58-40642 A | 3/1983 |
| JP | 8-315598 A | 11/1996 |
| JP | 11-282713 | 10/1999 |
| JP | 2000-090696 A | 3/2000 |

\* cited by examiner

*Primary Examiner*—Scott Baderman
*Assistant Examiner*—Timothy M. Bonura
(74) *Attorney, Agent, or Firm*—Buchanan Ingersoll & Rooney PC

(57) ABSTRACT

In an in-circuit emulator system, an in-circuit emulator debugger operated on a personal computer requests operation clock frequency, and transmits data for clock frequency designated by a user to an in-circuit emulator. The in-circuit emulator stores the received clock frequency data in a frequency data register. A PLL synthesizer oscillates with frequency based on the clock frequency data stored in the frequency data register to generate a clock.

4 Claims, 5 Drawing Sheets

IN-CIRCUIT EMULATOR SYSTEM WITH CHANGEABLE CLOCK FREQUENCY

BACKGROUND OF THE INVENTION

1) Field of the Invention

The present invention relates to an in-circuit emulator system used for developing programs of a microprocessor.

2) Description of the Related Art

An in-circuit emulator is a device that supports the debugging of hardware and software when developing a system on which a microcomputer is mounted. The in-circuit emulator is installed in a target system to be debugged, in place of the microcomputer of the target system, and an in-circuit emulator debugger executed on a personal computer reads contents of a register of the microcomputer and efficiently debugs the target system by tracing an instruction of the software. Therefore, the in-circuit emulator is essential to the development of the system with the microcomputer mounted thereon.

The lowest operating frequency and the highest operating frequency of an operation clock of the microcomputer are set in advance, and a clock frequency suited for a system developed by a user is determined within the set range. However, a plurality of oscillators or resonators are not always prepared in the in-circuit emulator. Therefore, the user is required to prepare an oscillator or a resonator for replacement so as to allow the system to operate with clock frequency other than that of the oscillator or resonator provided in the in-circuit emulator.

In order to solve the above problem, conventionally, an in-circuit emulator includes an internal clock generating circuit that uses a synthesizer having a variable oscillation frequency clock in the in-circuit emulator, in place of the oscillator or the resonator. The in-circuit emulator also includes a control circuit that controls the oscillation frequency of the internal clock generating circuit to supply the controlled oscillation frequency to a microcomputer. This type of in-circuit emulator is disclosed in Japanese Patent Application Laid-Open No. 58-40642.

However, the conventional in-circuit emulator has the following disadvantage. Since the control circuit controls the frequency of the internal clock generating circuit, a user cannot set an arbitrary clock in a simple manner.

Further, according to the conventional art, the in-circuit emulator operates in response to a clock supplied to the microcomputer. Therefore, the conventional in-circuit emulator has a disadvantage in that debugging time changes in proportion to the oscillation frequency of the internal clock generating circuit. That is, if the oscillation frequency of the internal clock generating circuit is high, the debugging time becomes short. If the oscillation frequency thereof is low, the debugging time becomes long.

SUMMARY OF THE INVENTION

The present invention has been achieved in order to solve the above problems. It is an object of this invention to provide such an in-circuit emulator system that a user can easily change a clock frequency supplied to a microcomputer to be debugged through a personal computer on which an in-circuit emulator debugger is operated.

The in-circuit emulator system according to the present invention includes an in-circuit emulator installed into a target system in order to debug hardware of the target system mounting on a microcomputer and software that operates the microcomputer in place of the microcomputer of the target system, a personal computer connected to the in-circuit emulator through a communication interface cable, and an in-circuit emulator debugger that is operated on the personal computer to control the in-circuit emulator. The in-circuit emulator includes a frequency data register that stores clock frequency data set by the in-circuit emulator debugger, a phase locked loop synthesizer that generates a clock based on the clock frequency data stored in the frequency data register, and a microcomputer that executes the software and a control program of the in-circuit emulator in place of the microcomputer mounted on the target system operated by the generated clock.

These and other objects, features and advantages of the present invention are specifically set forth in or will become apparent from the following detailed descriptions of the invention when read in conjunction with the accompanying drawings.

DETAILED DESCRIPTION

Embodiments of the in-circuit emulator system according to the present invention will be explained in detail below with reference to the accompanying drawings.

Figure 1:
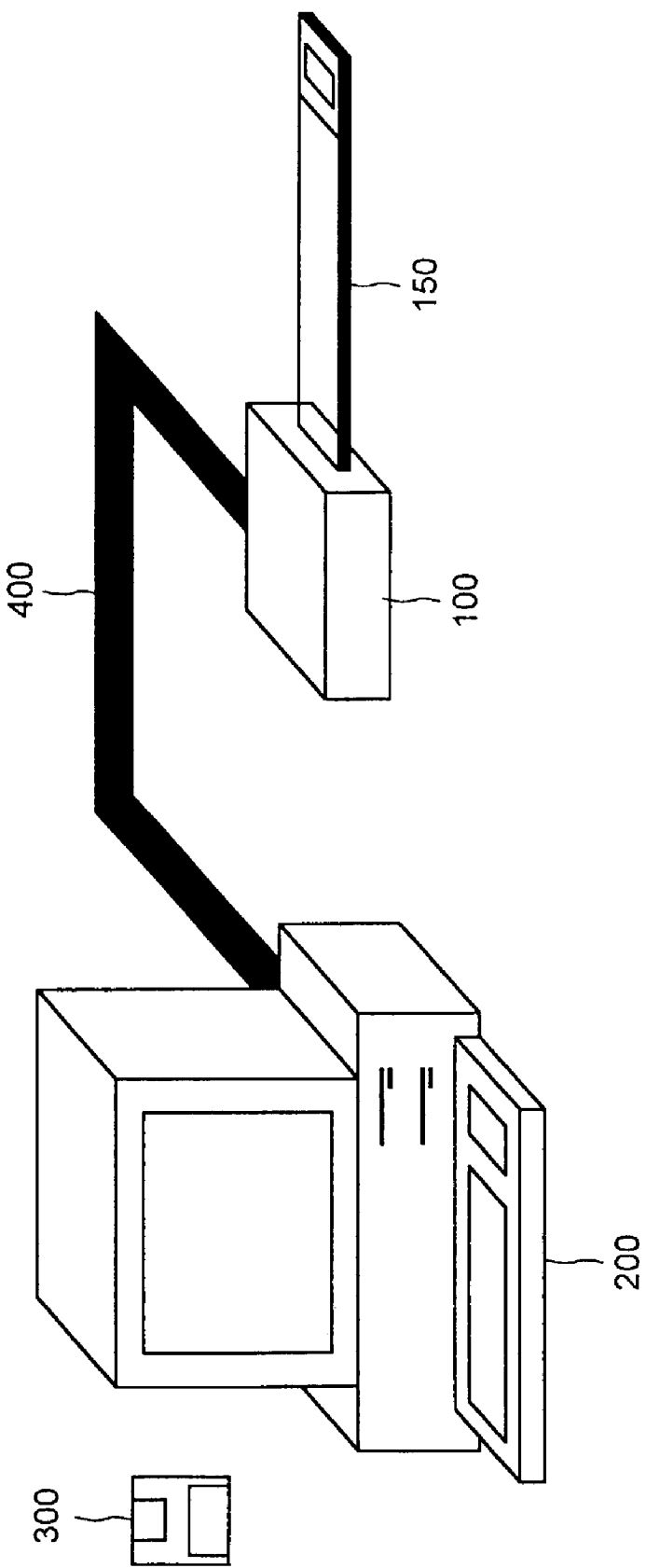
FIG. 1 shows a block diagram of the configuration of an in-circuit emulator system according to a first embodiment of the present invention.

A first embodiment of this invention will be explained with reference to FIG. 1 to FIG. 4. FIG. 1 shows a block diagram of the configuration of an in-circuit emulator system in the first embodiment. The in-circuit emulator system in the first embodiment is constituted to connect an in-circuit emulator 100 to a personal computer 200 by a communication interface cable 400. A cable 150 of the in-circuit emulator 100 is connected to a microcomputer of a debugging target system. An in-circuit emulator debugger 300 as software that controls the in-circuit emulator 100 operates on the personal computer 200. A user thereby carries out debugging of application software being developed using the in-circuit emulator 100 and the target system. That is, the user operates the in-circuit emulator debugger 300 through the personal computer 200, and controls the in-circuit emulator 100 to debug the target system.

As the communication interface cable 400, a universal serial bus (USB) cable, an LPT parallel cable or the like is employed.

Figure 2:
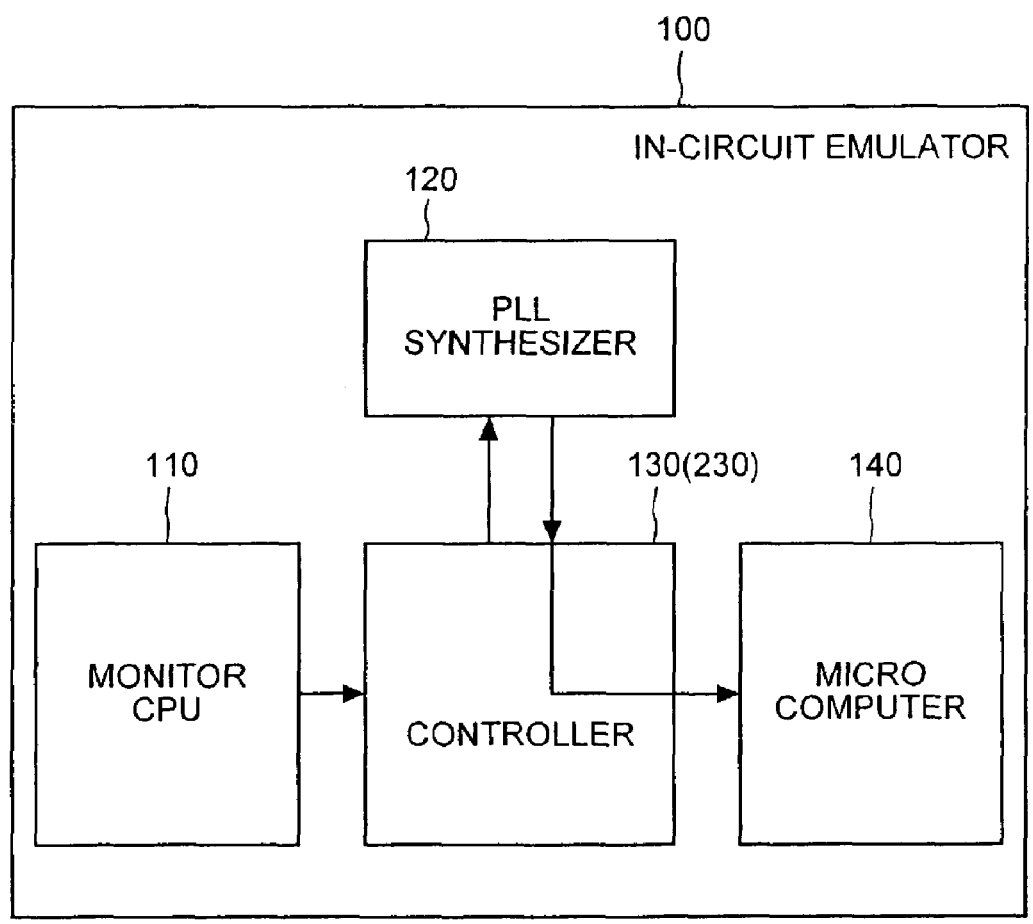
FIG. 2 shows a block diagram of the configuration of an in-circuit emulator shown in FIG. 1.

FIG. 2 shows a block diagram of the configuration of the in-circuit emulator 100 shown in FIG. 1. The in-circuit emulator 100 includes a monitor CPU (Central Processing Unit) 110, a phase locked loop (PLL) synthesizer 120, a controller 130, and a microcomputer 140.

The monitor CPU 110 communicates with the personal computer 200 through the communication interface cable 400.

The controller 130 sets a reference clock of the PLL synthesizer 120 based on clock frequency data notified from the monitor CPU 110, and entirely controls the respective constituent elements of the in-circuit emulator 100.

Figure 3:
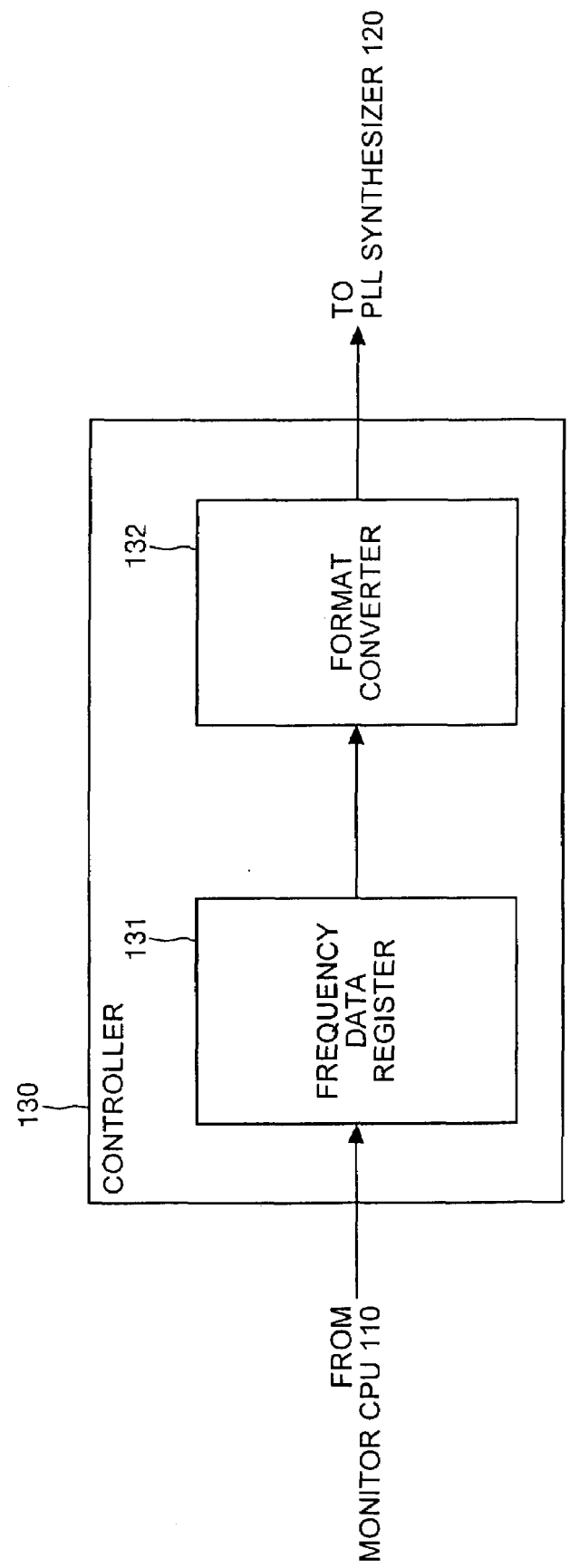
FIG. 3 shows a block diagram of the configuration of a controller shown in FIG. 2.

FIG. 3 shows a block diagram of the configuration of the controller 130 shown in FIG. 2. The controller 130 includes a frequency data register 131 and a format converter 132.

The frequency data register 131 holds the clock frequency data notified from the monitor CPU 110. The format converter 132 converts a format of the clock frequency data held in the frequency data register 131 into a format so that the clock frequency data can be set in the PLL synthesizer 120, and transmits the format-converted clock frequency data to the PLL synthesizer 120.

The PLL synthesizer 120 generates a clock based on the oscillation frequency set by the format converter 132 and supplies the generated clock to the microcomputer 140.

The microcomputer 140 is a microcomputer to be debugged by a user. The microcomputer 140 executes a user program and the control program of the in-circuit emulator 100 in response to the clock supplied from the PLL synthesizer 120.

Figure 4:
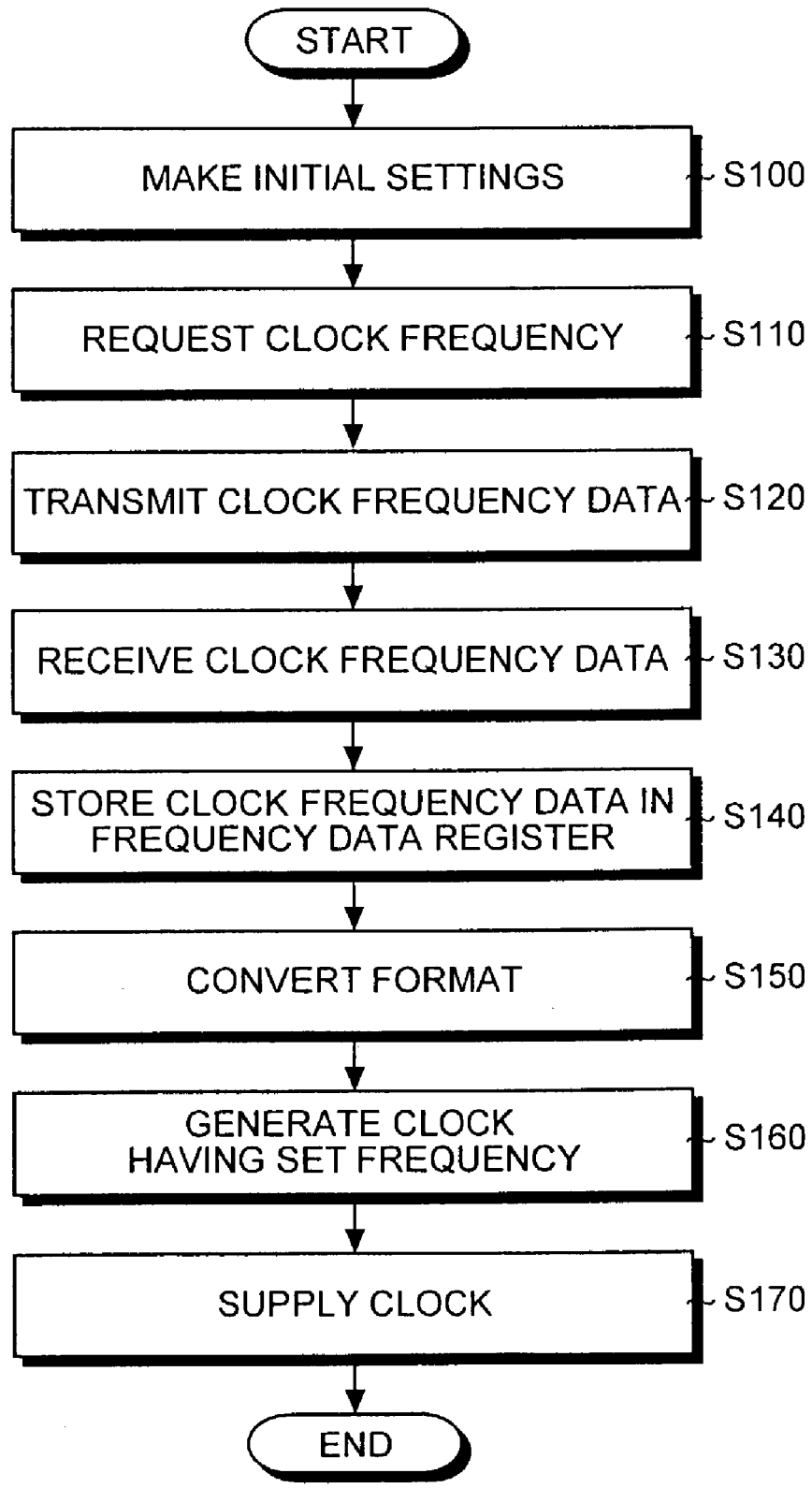
FIG. 4 shows a flow chart of the operation of the in-circuit emulator system according to the first embodiment.

Referring to the flow chart of FIG. 4, the operation of the in-circuit emulator system in the first embodiment for supplying a clock to the microcomputer 140 will be explained below.

When a user turns on the power of the in-circuit emulator 100, the controller 130 makes initial settings in the respective constituent elements of the in-circuit emulator 100 (step S100). When the user activates the in-circuit debugger 300 to be run on the personal computer 200, the in-circuit emulator debugger 300 requests clock frequency with which debugging is carried out (step S110). If the clock frequency is designated, the in-circuit emulator debugger 300 transmits clock frequency data on the designated clock frequency to the monitor CPU 110 through the communication interface cable 400 (step S120).

The monitor CPU 110 receives the clock frequency data (step S130), and stores the received clock frequency data in the frequency data register 131 (step S140).

When the clock frequency data is stored in the frequency data register 131, the format converter 132 converts a format of the clock frequency data into a format for the PLL synthesizer 120 and transmits the format-converted clock frequency data for the PLL synthesizer to the PLL (step S150).

Upon receiving the clock frequency data for the PLL synthesizer, the PLL synthesizer 120 oscillates with frequency based on the received clock frequency data for the PLL synthesizer and generates a clock (step S160). The PLL synthesizer 120 supplies the generated clock to the microcomputer 140 through the controller 130 (step S170).

As can be seen, in the first embodiment, the in-circuit emulator debugger 300 operating on the personal computer 200 requests the user to designate the clock frequency with which the target system operates. The clock frequency data on the user-designated clock frequency is transmitted to the in-circuit emulator 100. The monitor CPU 110 of the in-circuit emulator 100 stores the received clock frequency data in the frequency data register 131. The format converter 132 converts the format of the clock frequency data into the format for the PLL synthesizer 120. The PLL synthesizer 120 oscillates with frequency based on the format-converted clock frequency data to generate a clock. Thus, the user can easily change the clock frequency supplied to the debugging target microcomputer 140 using the personal computer 200 on which the in-circuit emulator debugger 300 operates.

Further, the PLL synthesizer 120 generates the clock supplied to the microcomputer 140, and therefore the user allows the in-circuit emulator 100 and the in-circuit emulator debugger 300 to start debugging the application software and the target system right after receiving the target clock frequency.

An in-circuit emulator system according to a second embodiment of the present invention will be explained below with reference to FIG. 5. In the first embodiment, the clock frequency with which the target system operates is designated by the user so as to execute the target user program and control program of the in-circuit emulator 100 with the designated clock frequency. Therefore, debugging time is determined by the clock frequency designated by the user. Namely, if the user-designated clock frequency is lower than the highest operating frequency of the in-circuit emulator 100, debugging time is disadvantageously lengthened.

In order to solve this problem, the second embodiment is configured to switch over from one operation clock to the other between the case where the user program is executed and the case where the control program of the in-circuit emulator 100 is executed.

The configuration of the in-circuit emulator system in the second embodiment is the same as that shown in FIG. 1, and the configuration of the in-circuit emulator 100 in the second embodiment is the same as that shown in FIG. 2. Therefore, the configurations will not be repeatedly explained.

Figure 5:
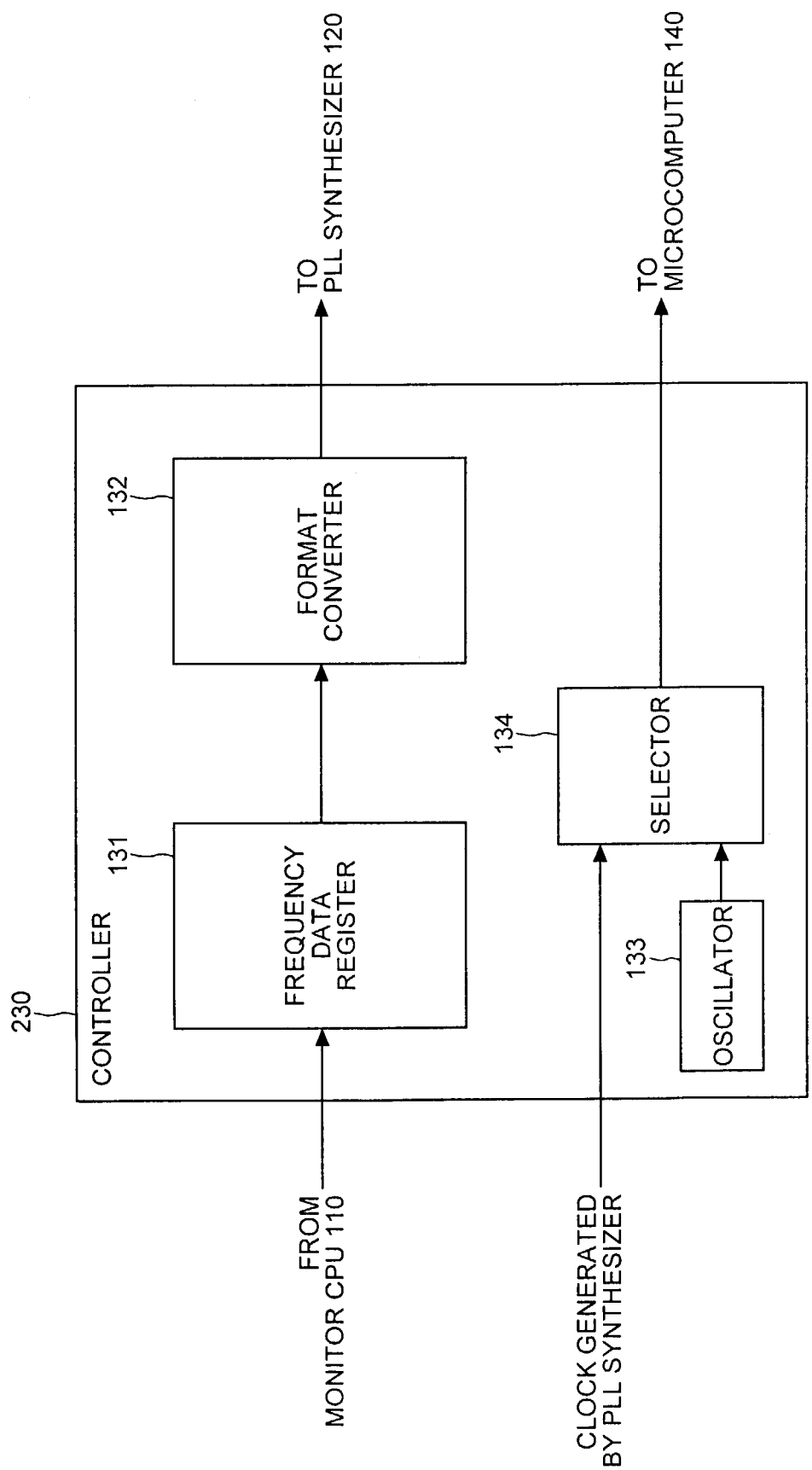
FIG. 5 shows a block diagram of the configuration of a controller of an in-circuit emulator system according to a second embodiment of the present invention.

FIG. 5 shows a block diagram of the configuration of a controller 230 in the second embodiment. The controller 230 in the second embodiment differs from the controller 130 in the first embodiment as shown in FIG. 3 in that an oscillator 133 and a selector 134 are additionally provided to the constituent elements of the controller 130. In FIG. 5, the constituent elements of the controller 230 that have the same functions as those of the controller 130 are denoted by the same reference numerals, respectively, and will not be repeatedly explained.

The oscillator 133 generates a clock having the highest operating frequency with which the control program of the in-circuit emulator 100 can be executed on a microcomputer 140. The selector 134 selects one of a clock from the PLL synthesizer 120 and the clock generated by the oscillator 133 in accordance with the designation made by the controller 230, and supplies the selected clock to the microcomputer 140.

The operation of the in-circuit emulator system in the second embodiment will be explained below. The in-circuit emulator system sets the operation clock of a target system in accordance with the clock setting procedures shown in the flow chart of FIG. 4 and starts debugging the target system. If the microcomputer 140 is operated in accordance with a user program, the controller 230 outputs a signal for selecting the clock of the PLL synthesizer 120 that is a clock designated by the user, to the selector 134. The selector 134 supplies the clock of the PLL synthesizer 120 to the microcomputer 140 based on the select signal. If the microcomputer 140 is operated in accordance with the control program of the in-circuit emulator 100, the controller 230 outputs a signal for selecting the clock of the oscillator 133 to the selector 134. The selector 134 supplies the clock of the oscillator 133 to the microcomputer 140 based on the select signal.

As can be seen, in the second embodiment, in executing the debugging of the target system, the in-circuit emulator system switches over the user-designated clock generated by the PLL synthesizer 120 to/from the clock having the highest operating frequency with which the control program of the in-circuit emulator 100 can be executed, between time when the user program is executed and when the control program of the in-circuit emulator 100 is executed. By so switching, it is possible to complete the control program in the in-circuit emulator 100 within a certain time without influencing the user-designated frequency, and to shorten debugging time.

Alternatively, if the microcomputer 140 executes the control program of the in-circuit emulator 100, the in-circuit emulator debugger 300 may request the user to select one of the clock from the oscillator 133 and the clock from the PLL synthesizer 120 to determine the clock through designation by the user.

As explained so far, according to the in-circuit emulator system of the present invention, the in-circuit emulator debugger that is operated on the personal computer requests a user to designate clock frequency with which the target system operates, and transmits data for the clock frequency designated by the user to the in-circuit emulator. The frequency data register of the in-circuit emulator stores the received clock frequency data. The PLL synthesizer oscillates with the frequency based on the stored clock frequency data to generate a clock. The microcomputer operates in response to the generated clock. Therefore, the user can easily change a clock frequency with which a clock that the user desires is supplied from the personal computer on which the in-circuit emulator debugger operates, to the debugging target microcomputer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An in-circuit emulator system comprising:
   an in-circuit emulator installed into a target system in order to debug hardware of the target system mounting on a microcomputer and software that operates the microcomputer; in place of the microcomputer of the target system,
   a personal computer connected to the in-circuit emulator through a communication interface cable; and
   an in-circuit emulator debugger that is operated on the personal computer to control the in-circuit emulator, wherein
   the in-circuit emulator includes
   a frequency data register that stores clock frequency data set by the in-circuit emulator debugger;
      a phase locked loop synthesizer that generates a clock based on the clock frequency data stored in the frequency data register; and
      a microcomputer that executes the software and a control program of the in-circuit emulator in place of the microcomputer to be mounted on the target system operated by the generated clock.

2. The in-circuit emulator system according to claim 1, wherein
   the in-circuit emulator further includes
   an oscillator that generates a predetermined clock; and
   a selector that selects the clock generated by the phase locked loop synthesizer when the microcomputer executes the software to be debugged, and selects the clock generated by the oscillator when the microcomputer executes the control program of the in-circuit emulator to output the selected clock to the microcomputer.

3. The in-circuit emulator system according to claim 2, wherein
   when the control program of the in-circuit emulator is executed on the microcomputer,
   the in-circuit emulator specifies either a clock generated by the oscillator or a clock generated by the phase locked loop synthesizer, and instructs the selector to select a specified clock, and
   the selector selects and outputs the specified clock to the microcomputer.

4. The in-circuit emulator system according to claim 1, further comprising a format converter that converts the clock frequency data stored in the frequency data register to a predetermined format and outputs the converted data to the phase locked loop synthesizer.

* * * * *